(12) United States Patent
Tian et al.

(10) Patent No.: US 9,869,569 B2
(45) Date of Patent: Jan. 16, 2018

(54) METHOD AND DEVICE FOR REMOTELY SENSING AND MONITORING PHYSICAL QUANTITIES WITH LOW POWER AD HOC NETWORK

(71) Applicant: RESEARCH INSTITUTE OF TSINGHUA UNIVERSITY IN SHENZHEN, Shenzhen (CN)

(72) Inventors: Zhou-He Tian, Beijing (CN); Joko Jiang, Beijing (CN)

(73) Assignee: RESEARCH INSTITUTE OF TSINGHUA UNIVERSITY IN SHENZHEN, Shenzhen (CN)

( * ) Notice: Subject to any disclaimer, the term of this patent is extended or adjusted under 35 U.S.C. 154(b) by 984 days.

(21) Appl. No.: 14/070,564

(22) Filed: Nov. 3, 2013

(65) Prior Publication Data

US 2014/0058690 A1    Feb. 27, 2014

Related U.S. Application Data

(63) Continuation of application No. PCT/CN2011/073728, filed on May 6, 2011.

(51) Int. Cl.
*G01D 21/02* (2006.01)
*H04Q 9/00* (2006.01)

(52) U.S. Cl.
CPC .............. *G01D 21/02* (2013.01); *H04Q 9/00* (2013.01); *H04Q 2209/25* (2013.01); *H04Q 2209/40* (2013.01)

(58) Field of Classification Search
CPC .................. G05B 15/02; F24F 11/0012; F24F 2011/0058; F24F 2011/0071;
(Continued)

(56) References Cited

U.S. PATENT DOCUMENTS 7,924,787 B2    4/2011  Lee
2007/0286205 A1*  12/2007  Johansen ............... H04L 45/00
                                                370/395.31

(Continued)

FOREIGN PATENT DOCUMENTS

CN          1949814 A      4/2007
CN          101753993 A    6/2010
CN          201753617 U    3/2011

*Primary Examiner* — Jung Park
(74) *Attorney, Agent, or Firm* — ScienBiziP, P.C.

(57) ABSTRACT

A device for remotely sensing and monitoring physical quantities with a low power ad hoc network is used for monitoring and remotely transmitting environment parameters of a locale where the device is located. The device includes a physical quantity acquisition and processing unit, a Z-Wave core unit, an audible and visual alarm unit, a direct-current (DC) power supply, a memory unit, a programmer port, and a radio frequency (RF) antenna and matching circuit. The Z-Wave core unit is bidirectionally connected to the physical quantity acquisition and processing unit, the RF antenna and matching circuit, the memory unit, and the programmer port through general input output (I/O) ports. An output terminal of the Z-Wave core unit is connected to an input terminal of the audible and visual alarm unit. The DC power supply provides stability power with suitable voltage to the Z-Wave core unit.

7 Claims, 12 Drawing Sheets

(58) Field of Classification Search
CPC ... F24F 2011/0073; G01D 21/02; H04Q 9/00; H04Q 2209/25; H04Q 2209/40
See application file for complete search history.

(56) References Cited

U.S. PATENT DOCUMENTS

| | | | |
|---|---|---|---|
| 2009/0222142 A1* | 9/2009 | Kao | G05B 15/02 700/291 |
| 2010/0177750 A1 | 7/2010 | Essinger et al. | |
| 2012/0275527 A1* | 11/2012 | Douglass | H04L 25/0278 375/257 |
| 2015/0131485 A1* | 5/2015 | Brandt | H04L 1/00 370/254 |
| 2015/0142945 A1* | 5/2015 | Brandt | H04L 47/623 709/223 |
| 2015/0187209 A1* | 7/2015 | Brandt | G08C 19/00 340/12.22 |

* cited by examiner

METHOD AND DEVICE FOR REMOTELY SENSING AND MONITORING PHYSICAL QUANTITIES WITH LOW POWER AD HOC NETWORK

BACKGROUND

1. Technical Field

The present disclosure relates to automatic test systems and remote sensing and monitoring, includes controllers, programmable excitation source and measurement unit, and a wireless transceiver unit. The present disclosure is applied in real-time, fast, multi-channel, and multi-parameter measurement which is difficult to be artificially completed or requires no human intervention, and also is applied in a large number of repeated comprehensive testing, and data acquisition and processing locales. The present disclosure particularly relates to on-line real-time measurement about environmental parameters and wireless transmission information with ad hoc network, and further particularly relates to remotely sensing and monitoring carbon monoxide, temperature, and humidity through Z-Wave networks.

2. Description of Related Art

The physical quantities of the present disclosure relate to voltages, current, power factors, electricity consumption, magnetic switches, rate of flow, pressure, weight, and three-axis angular velocity and gyros, and particularly relate to environmental parameters including temperature, humidity, oxygen content, and radiation intensity of monitored locales, and concentration of harmful gases scattered in the air of the monitored locales, such as carbon monoxide, formaldehyde, and hydrogen sulfide, and concentration of various radioactive dusts, such as iodine-131. The high concentration of the harmful gases and the radioactive dust will seriously threaten people's health and safety. It is necessary to quickly monitor real-time values of the physical quantities and accurately and reliably transmit the values to local computers for further storing, analysis and determination with remote computers.

Current monitoring of the physical quantities mostly adopts monitoring devices based on locale bus. Thus, there may exist shortcomings, such as poor mobility, difficulty in laying cables, and easily tearing cables, in particular, there exists security risks when the monitoring devices are used to detect dangerous locales.

The method and device of the present invention for remotely sensing and monitoring physical quantities are low power consumptive, low-cost, high reliable, self-organizational, and self-healing mesh network. The frequencies of the network are 908.42 MHz (for America), 868.42 MHz (for Europe and China), and others which are less than 1 GHz and covers the global scope. The network adopts a FSK modulation mode, data transfer rates of 9.6 Kbps/40 Kbps, an indoor distance 10~30 m, an outdoor directly viewing and accessible distance of 50~100 m, and is used in narrowband applications locales.

The device with the method of the invention has a low power consumption, and can be powered by dry batteries, having a long service life, compact in volume, easy to be installed, capable of being integrated into wireless network systems for monitoring carbon monoxide concentration and temperature. The device with the method also can be used in wireless systems for monitoring carbon monoxide concentration and temperature.

The device of the invention is a very practical and rare product in the winter. As is well known, carbon monoxide (CO) is colorless, odorless, tasteless, and toxic gas. Under normal circumstances, at 40 ppm concentration and about 393 minutes, and at 70 ppm concentration and about 93 minutes, the carbon monoxide would harm the human body. The higher concentration and the more short time can cause more serious harm to the human body. Death or illness caused by CO occurs yearly.

The device with the method of the invention need help of computers and MID (Mobile Internet Device). However, with widely use and low cost of computers, and development and application of smart handheld devices, the method and device of the invention will eventually has a high market share. The design of the present invention is taken as a low-cost solution, to reduce the system cost based on good performance.

SUMMARY

The present disclosure provides a method and device for remotely sensing and monitoring physical quantities with low power ad hoc network, to monitor and remotely transmit the environment parameters of the locale where the device is located, thereby avoiding the shortcomings of the above-mentioned prior art technology.

Advantages and expandability of the method and device of the disclosure beyond the prior art are:

First, describing the technical advantages.

Z-Wave technology is the latest wireless short-distance communication technology with low-cost and low-power, and was developed after BLUETOOTH and ZIGBEE. They have their own characteristics, and a comparison about their coverage range, device activation time, receiving sensitivity, the right to use, and cost is shown in Table 1:

TABLE 1

| Main feature comparison table of Z-Wave, ZIGBEE, BLUETOOTH: | | | |
| --- | --- | --- | --- |
| Character | Z-Wave | ZIGBEE | BLUETOOTH |
| Coverage range (m) | 10--100 | 10--70 | 10 |
| Device activation time | 5 ms | 15 ms | 3 sec |
| Receiving sensitivity (Dbm) | −98 | −94 | −70 |
| Transmission speed rate (Kbps) | 9.6/40/100 | 250@2.4 GHz 40@915 MHz 20@868 MHz | 1000 |
| Node capacity | 232 | 65536 | 8 |
| The right to use | Free | Free | Authorization required |
| Cost | 2 U.S. dollars | 3 U.S. dollars | 5 U.S. dollars |

From table 1, we can summarize the unique characters and advantages of Z-Wave technology:

1. Low data transfer rate: Z-Wave focuses on low transmission applications, the data transfer rate of the products of the earliest version is 9.6 Kbps. The data transfer rate of the products of the high version can support 40 Kbps, and the data transfer rate of the fourth generation products can support 100 Kbps, which is more than sufficient to be used to transmit control commands.

2. Low power consumption: it only consumes 50 µA current in a sleep mode, two dry batteries connected in series can be used for more than 1 year, and the operation current is only slightly greater than 20 mA.

3. Network capacity is moderate: a single Z-Wave network system can most support 232 nodes, and it also can expand more network nodes through local area network. In applications of a family, or a small range of industry or agriculture, the 232 nodes are sufficient.

4. Short time delay: device activation time in the Z-Wave network is generally 5 ms.

5. Good anti-interference ability: Z-Wave uses bidirectional responsive transport mechanism, compressed frame format, stochastic inverse algorithm to reduce interference and distortion, thus preventing control problems and interference caused by neighboring networks and ensures high reliable communications between devices.

6. Working band covers most of the countries and regions in the world: the working band in United States of America is 908.42 MHz. The working band in Europe, China, and Singapore is 868.42 MHz. The working band in Hong Kong is 919.82 MHz. It is suitable for worldwide application.

Through the above comparison, it is easy to show that Z-Wave technology in these aspects meets the requirements of the present disclosure. The applicant adopts the latest technical solutions in rural and urban households, laboratories, agricultural greenhouses, some industrial applications, and other application locales.

Second, describing the network advantage.

An advantage of the Z-Wave technology is its mesh network structure. Mesh network, also called "multi-hop" network, is a flexible architecture used to efficiently transmit data between devices. Z-Wave sensor network using a mesh network topology has many advantages. In the "single-hop" network, if an access point is paralyzed, a virtual severe traffic congestion will happen, and the system speed will be reduced. The use of a mesh network architecture allows many devices access the network through different nodes simultaneously, to simultaneously transmit data in different spaces, and the system performance will not be degraded. Details about FIG. 5-1 and FIG. 5-2 are described below.

In FIG. 5-1, any kind of access device can be used as a router or an access point, so that when two sensor nodes in the network cannot communicate with each other directly, other nodes located between the two nodes can be selected to function as routing nodes for achieving the communication between the two nodes. The node NODE1 must be a controller in the network system. For example, when the node NODE1 needs to communicate with the node NODE4, the node NODE1 can reach the node NODE4 through the node NODE3. In the Z-Wave wireless network, Z-Wave protocol in the Z-Wave mesh network can be confirmed through the frames, re-transmission, collision avoidance, frame check, to ensure the transmission of routing packets.

Z-Wave mesh structure refers to hoc network problems. The hoc network of Z-Wave is simple and facile. A master node that is a main controller is set in the Z-Wave network, and then a Z/IP router of the main controller assigns a HOME ID and a NODE ID to the master node. When other nodes are added in the network for networking, Z-Wave network will automatically assign the HOME ID the same as the master controller to the added nodes and assign different and unique NODE IDs to the added nodes, according to the orders of the nodes added in the network. Which prevents control or interference problems caused by the adjacent networks. The Z-Wave networks is fast, and is simple in operation, thus, can install more devices in home network conveniently. When one device needs to be removed, the device can be removed from the port of the master controller, and a node table in the master controller will be automatically updated. Each node in the Z-Wave network has its own unique address identification NODE ID, so the Z-Wave users can manage the Z-Wave network easily.

Z-Wave networking is shown in FIG. 5-2. If an air conditioning device needs to be added in the network, Z-Wave network will assign the HOME ID the same as the network and a NODE ID NODE6 to the air conditioning device. However, the network node number is added according to the order of the device being added in the network. If an exited node of the network needs to be re-added in the network, and there are no other nodes added in the network, the node number will become NODE7. NODE6 will become an empty node, the node NODE6 will no longer appear in the system.

Third, describing the expandability:

The physical quantities that the method and apparatus of the present disclosure can monitor not only monoxide concentration, temperature, and humidity, but also voltage, current, power factor, power consumption, magnetic switches, three-axis angular velocity and gyroscope, flow, pressure, and weight, thereby making the method and apparatus monitor environmental conditions of the target locale.

Z-Wave is a low-rate, short-distance wireless communications technology, which is a wireless networking standard single-handedly led by the Danish Zen-sys company. The core micro-controller of the Z-Wave adopts six-speed 8051 serial architecture, with Flash ROM of 32 KB and SRAM of 256 KB. The routing protocol adopted by the Z-Wave is Source Routing, which is a wireless technology to lock home automation platform. Z-Wave has features, such as low cost, low power consumption, high reliability, good transmission stability, good real-time, capable of being adjusted with the rapid adjustment of its network, good network adaptability, and easy to install products. Z-Wave can be used in urban and rural families, laboratories, agricultural greenhouses, and some industrial locales.

The solution to solve the technical problems is providing a method for remotely sensing and monitoring physical quantities with low power ad hoc network to remotely sense and monitor environmental parameters and related physical quantities of the target locale. Convert physical quantities sensed by various types of sensors located in the target locale to electrical signals, and transmit the electrical signals to a remote controller for processing and operation through the wireless network. The method includes the following steps.

In step A, intelligent sensors are set in the target locale for sensing at least one type of physical quantities, data conversion and data correction, compensation, and data storage, and the physical quantities sensed by each sensor are converted to quantized data in a fixed format.

In step B, an embedded CPU of the Z-Wave module is used as a master microprocessor, read/write command address and timing of the intelligent sensors in the software are ensured. General purpose I/O ports of the Z-Wave module and special I/O ports of the intelligent sensors, which sense and monitor the physical quantities are adopted, to achieve connection in hardware, thereby realizing bidirectional communication control function.

In step C, the Z-Wave network system has a mesh network topology structure, which includes nodes added in the network. Wherein the mesh network topology structure has self-organizing and self-healing flexible mechanisms, and the addition and removal of each node is executed through a remote controller.

In step D, E2PROM or flash circuits are set, to protect configuration parameters, the routing table, the network identification number HOME ID, and some Z-Wave protocol data of the Z-Wave system.

In step E, initial files are burned through a programming port. Wherein, the programming port and the Z-Wave module are capable of communicating with the master controller circuit through three-wire SPI port, MISO, MOSI, SCLK, and chip select signals EE_CS.

In step F, in the same network, the maximum number of nodes is 232, and the nodes only have a unique and identical HOME ID, and have different NODE IDs, to ensure network security.

the network system in step C includes less than 231 wireless device nodes and a controller and/or a second portable controller. Each node can be used as a relay router to transmit data, according to ad hoc network and self-healing mesh network architecture of wireless nodes.

When the monitored physical quantities of one node, which is received by the remote controller, reaches a warning value or an unreasonable value, the wireless node will give an alert about sound or light, and upload data to the controller. The system processes the data according to actual condition.

The Z-Wave module applied in the step B has a radio frequency front end, which is a miniature planar antenna formed on the printed circuit board, and is an LC matching network manufactured or soldered on the printed circuit board. The matching impedance is 50 ohms, and thus the Z-Wave module is cost-effective.

The physical quantities to be monitored in the step A include harmful gas concentration, temperature, and humidity all belonging to the environmental parameters, and pressure, flow, weight, switch quantities, voltage, current, power factor, and power consumption belonging to other relevant physical quantities.

The harmful gas concentrations belonging to environmental parameters include concentrations of carbon monoxide, hydrogen sulfide, formaldehyde, and radioactive dusts in ambient air.

The solution adopted by the present disclosure to solve the technical problems also provides a device for remotely sensing and monitoring physical quantities with low power ad hoc network, to monitor and remotely transmit environment parameters of the locale where the device is located. The device includes a physical quantity acquisition and processing unit, a Z-Wave core unit, an audible and visual alarm unit, a direct current (DC) power supply, a memory unit, a program port, and a radio frequency antenna and matching circuit. The Z-Wave core unit is bidirectionally connected to the physical quantity acquisition and processing unit, the radio frequency antenna and matching circuit, the memory unit, and the program port through general purpose I/O ports. The program port is bidirectionally connected to the memory unit through the SPI ports. An output terminal of the Z-Wave core unit is connected to an input terminal of the audible and visual alarm unit. The DC power supply provides stable power to the Z-Wave core unit.

The Z-wave core unit adopts the third generation Z-wave module ZM3102N, and the version of the module software system is 4.52. The hardware circuit of the Z-Wave core unit is compatible with the fourth generation Z-Wave module ZM4102.

The physical quantity acquisition and processing unit can achieve data communication and instruction control with the Z-wave core unit through using the SPI ports. The SPI ports are 3-line and include SCK/SDO/SDI lines. The Z-wave core unit is an SPI master, and the physical quantity acquisition and processing unit is an SPI slave.

The DC power supply adopts two-way power sources, one of which is provided by a 5.0V standard mini USB port, and the other of which is provided by a 4.5V, which includes three dry batteries connected in series.

The DC power supply provides a 3.3V stable voltage with low noise LDO ways. Namely, the 5.0V voltage is obtained from the standard mini USB port and is reduced to 4.5V through E1-FB3 and C9-C10 high frequency filtering network, and then through the C1-FB2 high frequency filtering nodes. In some embodiments, the 4.5V is directly obtained from the dry battery group through the high frequency choke FB1 and then through the U1 stable voltage integrated circuit and the filtering capacitors C4-C5 and C7 of the output terminal of the U1 stable voltage integrated circuit, to get the stable and pure 3.3V.

The radio frequency antenna of the radio frequency antenna and matching circuit is a mini flat antenna and integrated in the printed circuit board. The output impedance of a requirement frequency point of the radio frequency antenna and matching circuit is 50 ohms.

The memory unit is an electrical erasable programmable read only memory (E2PROM) or a flash memory Flash ROM with flash media.

Compared with the prior art, the advantages of the method and device for remotely sensing and monitoring physical quantities with low power ad hoc network of the present disclosure are that the physical quantities in the locale where the Z-Wave module is located are remotely and locally monitored through remotely and wirelessly operating the Z-Wave module. The device can be used in rural and urban households, laboratories, agricultural greenhouses, some industrial application locales. It is low power consumption, low cost, available battery-powered, long life, compact, easy to be installed, and can be integrated into a wireless network system, which is used to monitor carbon monoxide concentration and temperature. It also can be applied to a wireless system, which is used to monitor the carbon monoxide concentration and temperature.

BRIEF DESCRIPTION OF THE DRAWINGS

FIGS. 4-1, 4-2A, 4-2B, 4-2C, 4-3, and 4-4 are circuit diagrams of the device of FIG. 1.

FIG. 4-1 is a circuit diagram of a Z-wave module, and a radio frequency antenna and matching circuit of the device of FIG. 1.

FIGS. 4-2A, 2B and 2C are circuit diagrams of a direct current power supply of FIG. 1.

FIG. 4-3 is a circuit diagram of an EEPROM programmer port of FIG. 1.

FIG. 4-4 is a circuit diagram of a system programmer port and a carbon monoxide concentration, temperature, and humidity sensor port of FIG. 1.

FIG. 5-1 and FIG. 5-2 are schematic diagrams of characters of the Z-wave network.

FIG. 5-1 is a schematic diagram of a reticulation network.

FIG. 5-2 is a schematic diagram of an ad hoc network.

DETAILED DESCRIPTION

A first embodiment shows a device for remotely sensing and monitoring carbon monoxide CO, which is described below.

The First Embodiment

Figure 1:
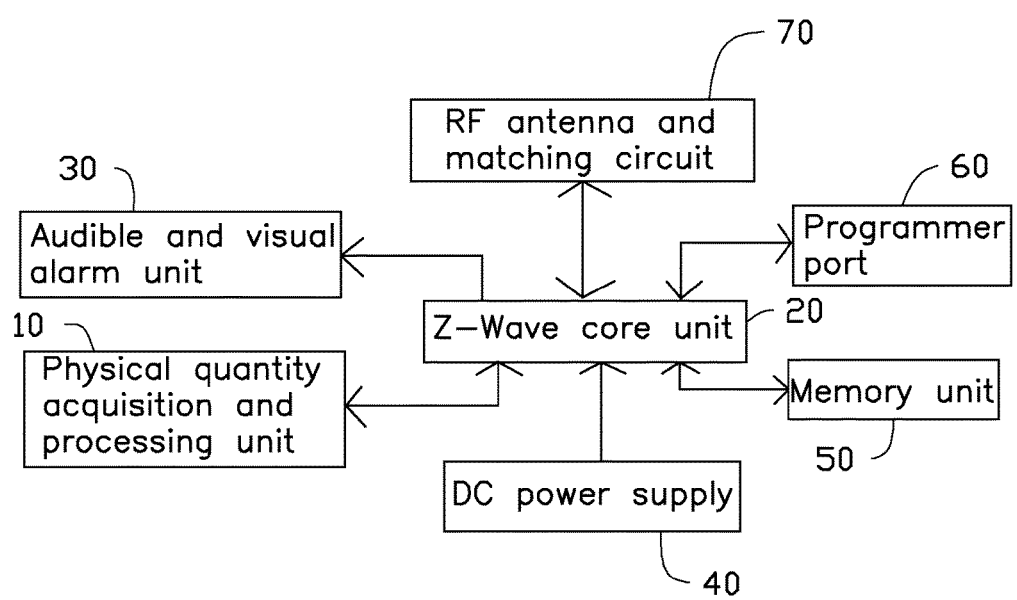
FIG. 1 is a block diagram of a device for remotely sensing and monitoring physical quantities in accordance with an embodiment of the present disclosure.
Figure 2:
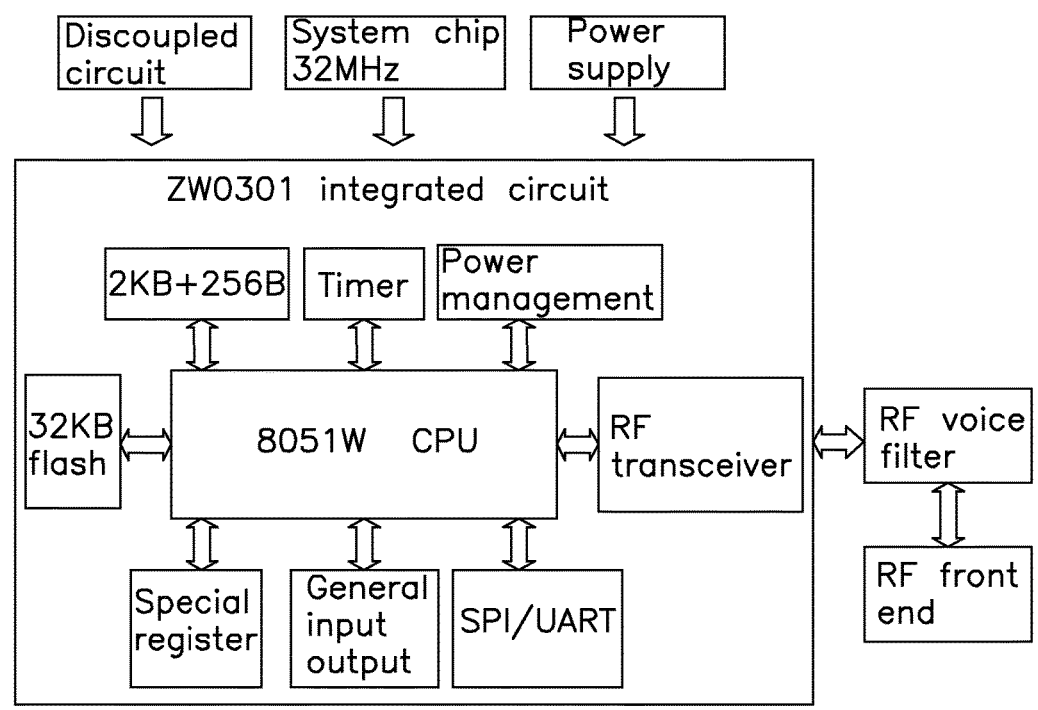
FIG. 2 is a block diagram of a Z-wave core unit of the device of FIG. 1.
Figures 1, 4:
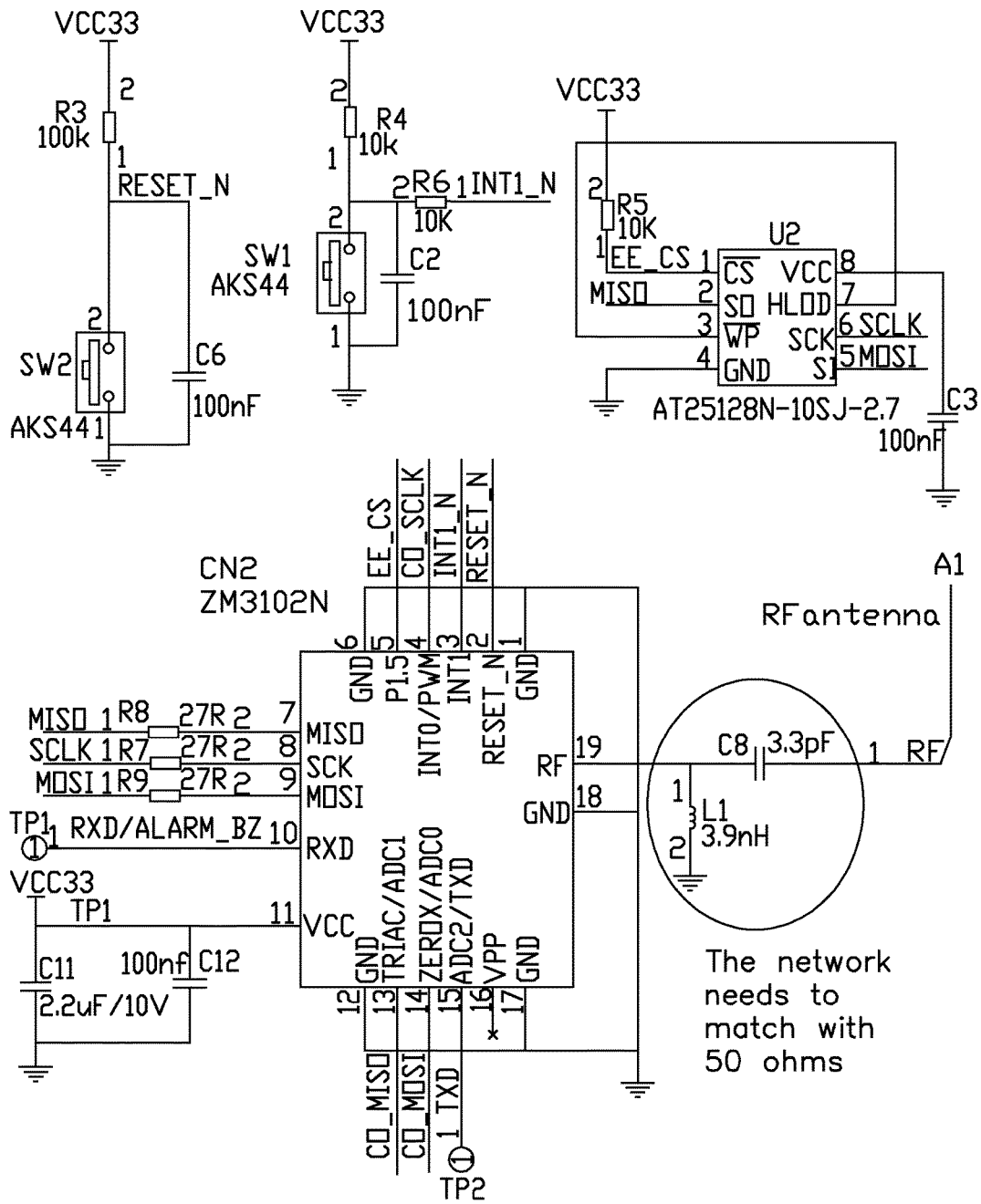
Figures 2A, 4:
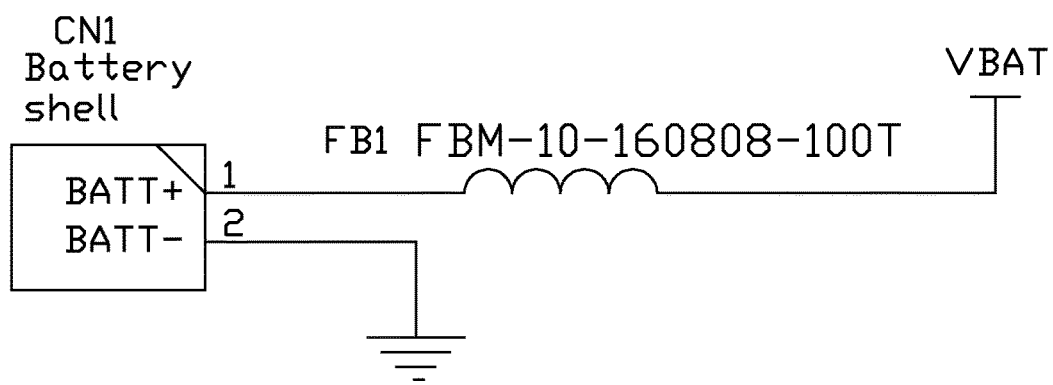
Figures 2B, 4:
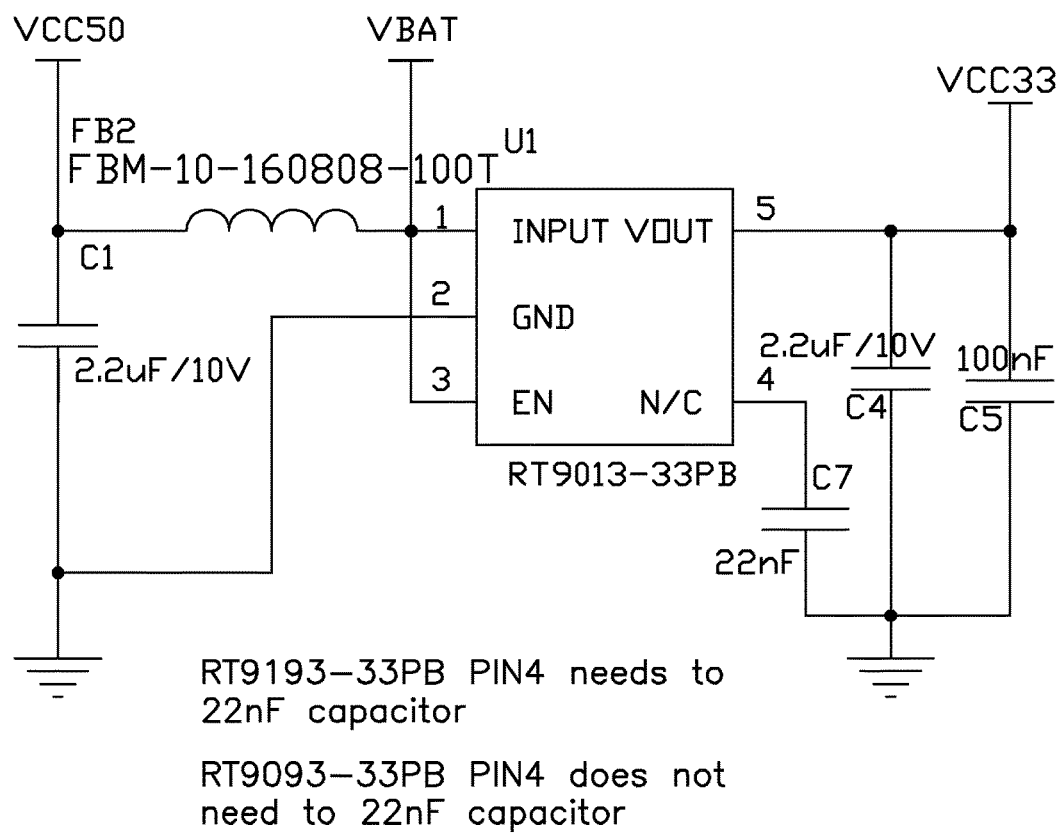
Figures 2C, 4:
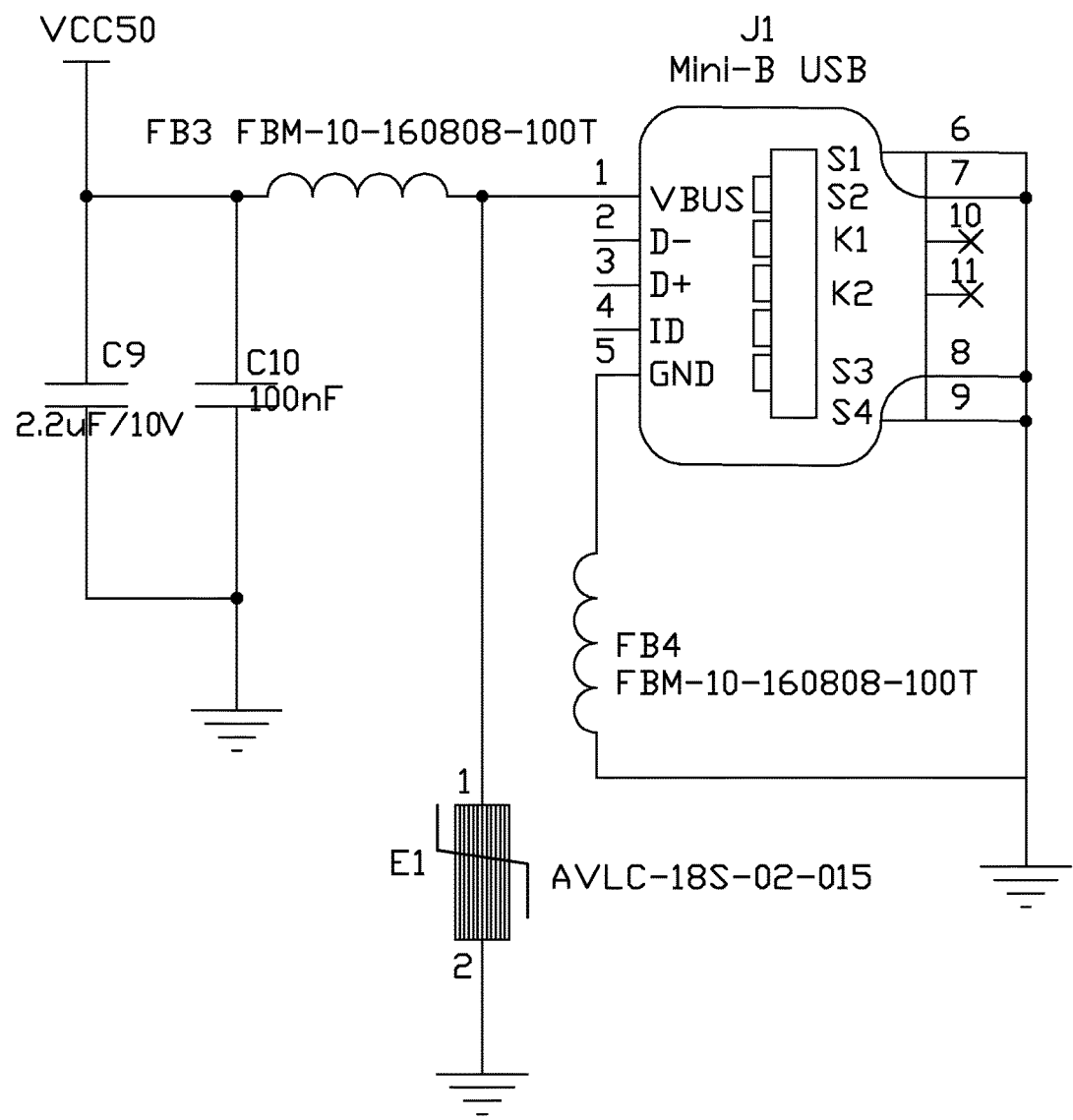
Figures 3, 4:
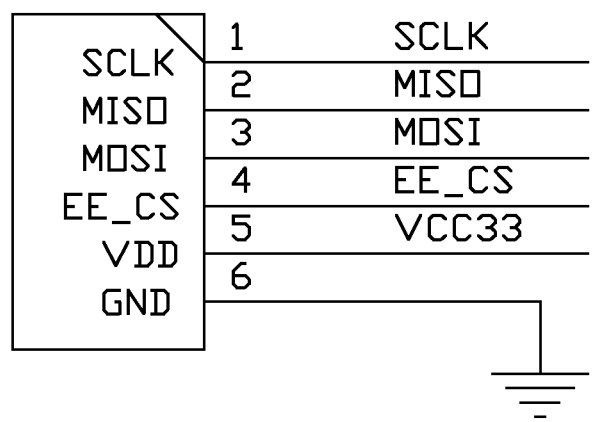
Figure 4:
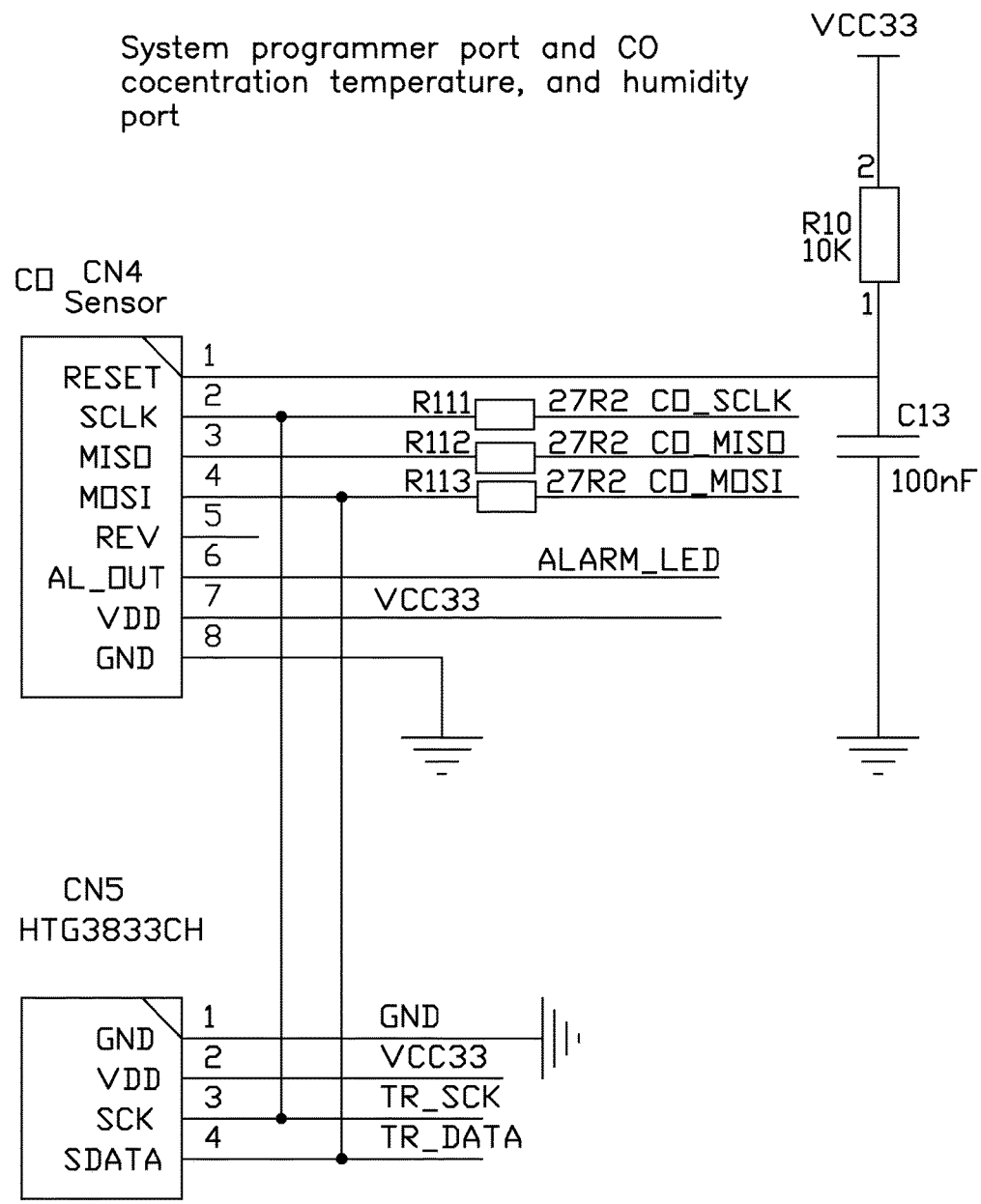
Figures 1, 5:
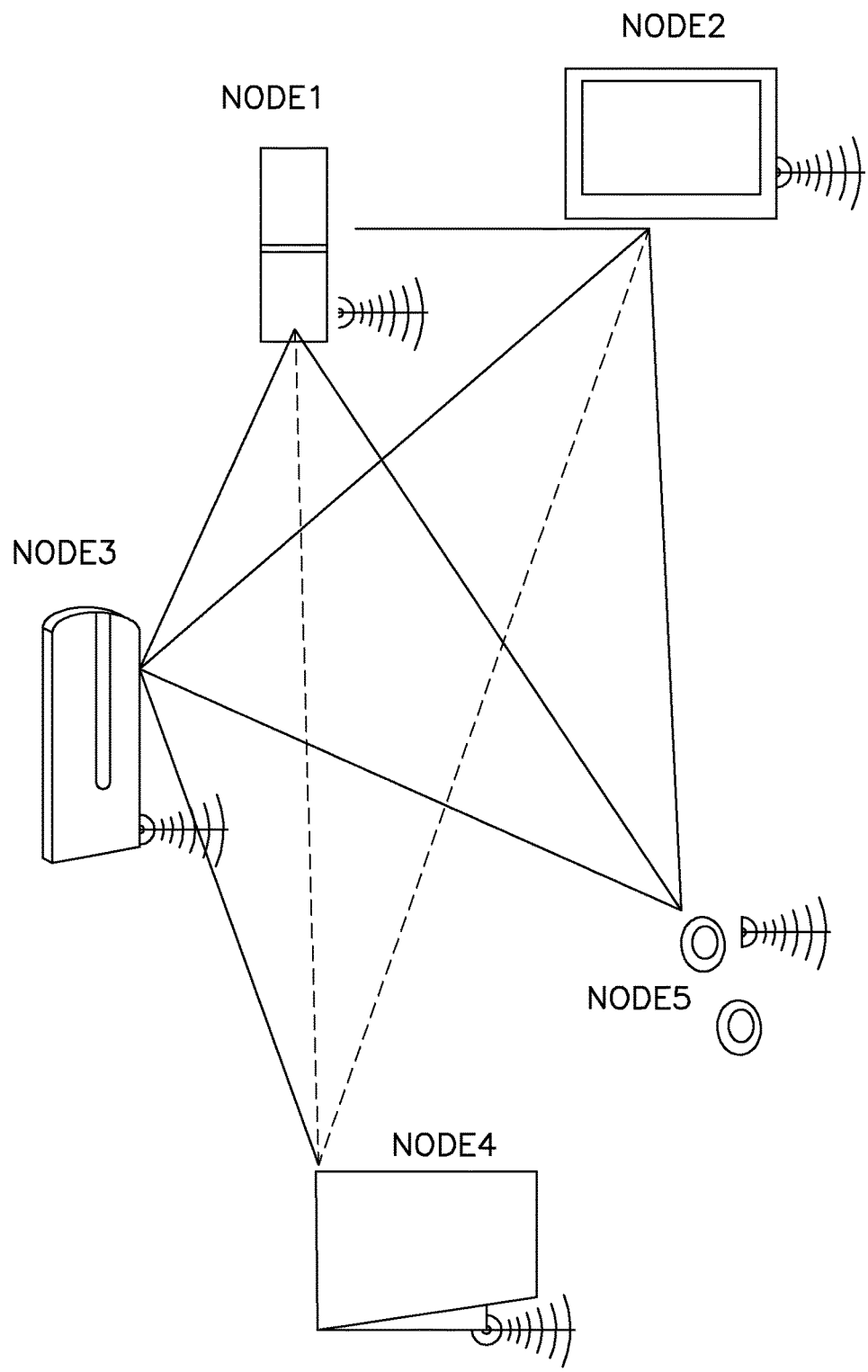
Figures 2, 5:
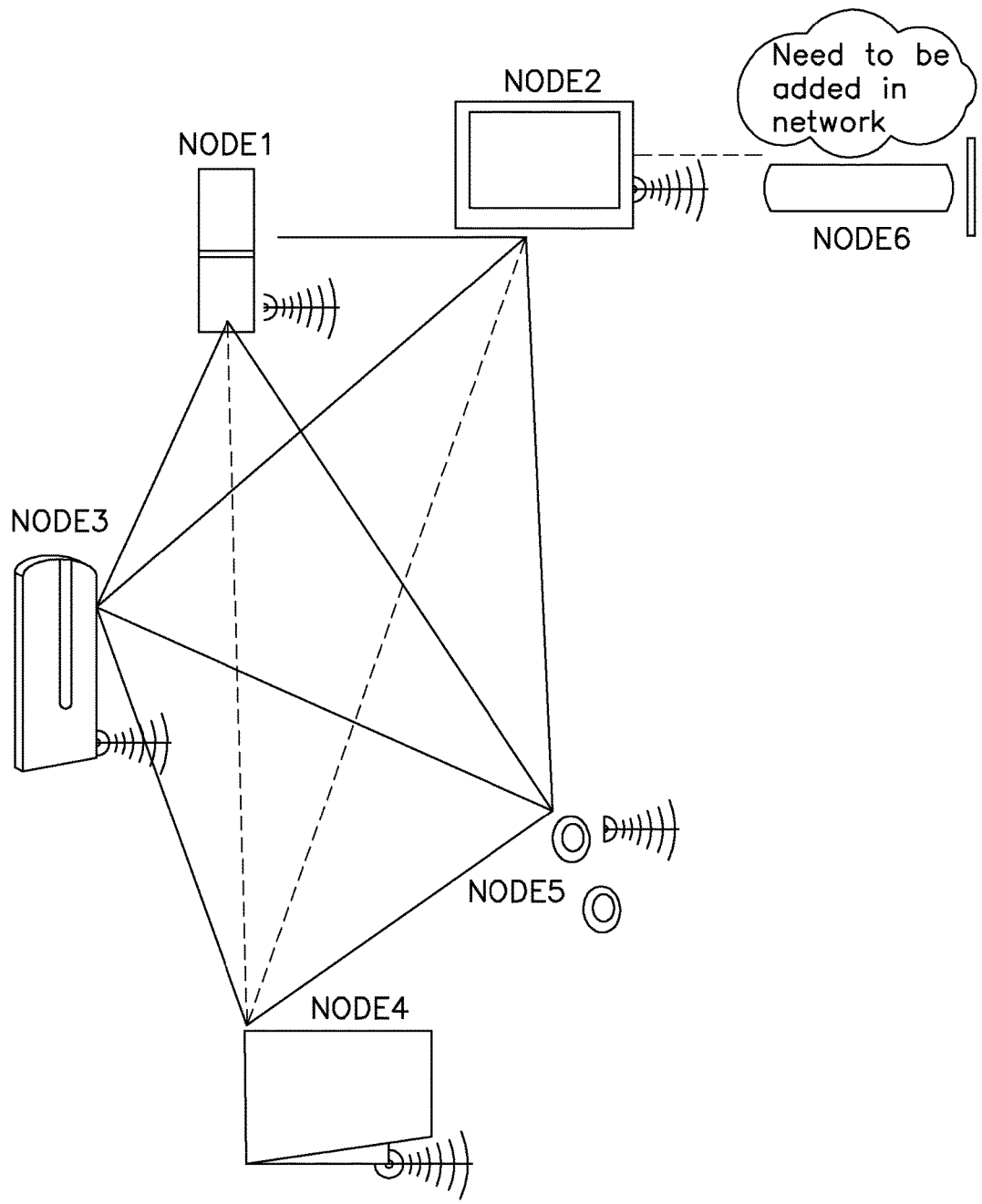

FIGS. 1 to 3 show a device, for remotely sensing and monitoring carbon monoxide (CO), used for monitoring and remotely transmitting carbon monoxide concentration of a locale where the device is located. The device includes a physical quantity acquisition and processing unit 10, a Z-wave core unit 20, an audible and visual alarm unit 30, a direct current (DC) power supply 40, an E2PROM storage unit 50, a programmer port 60, and a radio frequency (RF) antenna and matching circuit 70. The Z-wave core unit 20 is bidirectionally connected to the physical quantity acquisition and processing unit 10, the RF antenna and matching circuit 70, the E2PRM storage unit 50, and the programmer port 60 through general input output (I/O) ports. The programmer port 60 is bidirectionally connected to the E2PROM storage unit 50 through SPI ports. An output terminal of the Z-wave core unit 20 is connected to an input terminal of the audible and visual alarm unit 30. The DC power supply 40 provides a voltage to the Z-wave core unit 20. Each constitution unit of the device is compact, organically combined on a printed circuit board, which is reasonable in layout, and capable of minimizing externally generated and self-generated electro magnetic interference (EMI).

The physical quantity acquisition and processing unit 10 includes a carbon monoxide concentration intelligent sensor, which is a carbon monoxide sensor adopting bipolar electrochemical detection principle. When the concentration is 0-1000 ppm, the resolution of the outputted current of physical quantity acquisition and processing unit 10 is 1.2-2.4 nA/ppm, after the physical quantity acquisition and processing unit 10 sampling, amplification, analog to digital conversion and a series of processing done by the microprocessor, and the physical quantity acquisition and processing unit 10 adopts 3-wire SPI communication. The Z-wave system is an SPI master, and the CO module is an SPI slave. The carbon monoxide concentration sensor monitors the carbon monoxide concentration and outputs an audible and visual alarm when the carbon monoxide concentration reaches a preset concentration. The carbon monoxide concentration sensor and the Z-wave module can communicate with the main control circuit through the 3-line SPI port, MISO, MOSI and SCLK, and the selection signal EE_CS, to output the concentration value of CO, the unit is ppm (millionth). The alarm indication can be set according to requirements of users. At present, a period of the alarm indication is 5 seconds. The alarm light may be lit for 1 second and be extinguished for 4 seconds, to reduce operation current.

The E2PROM storage unit 50 includes a PROM with flash medium and used for storing the preset parameters of the Z-wave system, the routing table, the HOME ID, and a part of Z-wave protocol data. The original file can be burned through the programmer port 60.

The Z-Wave core unit 20 adopts the third generation Z-wave module ZM3102N, and the version of the module software system is 4.52. The main function of the Z-Wave core unit 20 is as a main microcontroller, to achieve the functions of addition, removal, data receiving, data transmitting, abnormally processing, and power management of network system nodes of the Z-wave.

FIG. 2 shows that the Z-wave core unit 20 includes a special ZW0301 integrated circuit. The integrated circuit includes 8051W microprocessor, 32 KB flash, special register, power management, interrupt controller, (2 KB+256 B) SRAM, SPI/UART port, silicon controlled controller, and general I/O port. Decoupling circuit, the 32 MHz chip, RF filtering circuit, and the radio front matching circuit are all arranged on periphery of the ZW0301 and compose the core modules of the system.

In hardware design, the Z-wave core unit 20 is compatible with the fourth generation Z-wave module ZM4102.

The physical quantity acquisition and processing unit 10 and the Z-wave core unit 20 can achieve data communication and instruction control through using SPI ports. The SPI port is 3-line and includes SCK/SDO/SDI lines. The Z-wave core unit 20 is an SPI master, and the physical quantity acquisition and processing unit 10 is an SPI slave.

The DC power supply 40 adopts two-way power supplies, one of which is provided by a 5.0V standard mini USB port, and the other of which is provided by a 4.5V, which includes three dry batteries connected in series. The DC power supply 40 provides a 3.3V stable voltage with low noise LDO ways. Namely, the 5.0V voltage is obtained from the standard mini USB port and is reduced to 4.5V via E1-FB3 and via C9-C10 high frequency filtering network, and then via the C1-FB2 high frequency filtering nodes. In some embodiments, the 4.5V is directly obtained from the dry battery group through the high frequency choke FB1 and then through the U1 stable voltage integrated circuit and the filtering capacitors C4-C5 and C7 of the output terminal of the U1 stable voltage integrated circuit, to get the stable and pure 3.3V, and assure the minimized EMI and best performance of RF.

The RF antenna and matching circuit 70 is a mini flat antenna and integrated in the printed circuit board, which is low cost, and the output impedance of the requirement frequency point of the RF antenna and matching circuit 70 is 50 ohms. In particular, the characteristic impedance value of different frequency points can be obtained through S parameter Smith diagram of network analyzer, to obtain an optimal match, which is an important part for assuring the data transmitting distance. The design of the RF part is compatible with the 868.42 MHz (for Europe and China) and 908.42 MHz (for America), to make the antenna far away from the circuit for assuring effective receiving and sending for the RF signals.

Figure 3A:
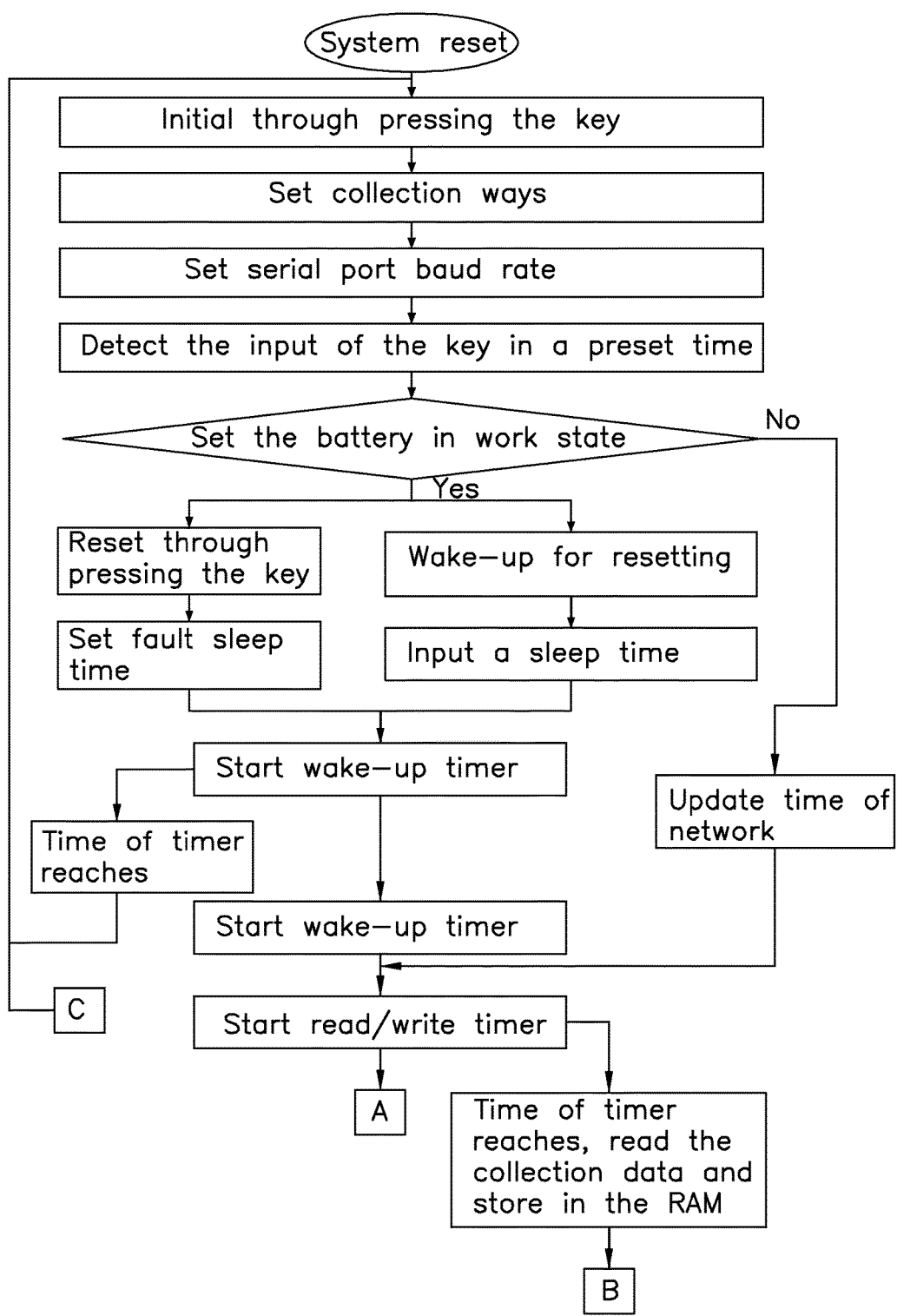
FIGS. 3A and 3B are flowcharts of a software system of the device of FIG. 1.
Figure 3B:
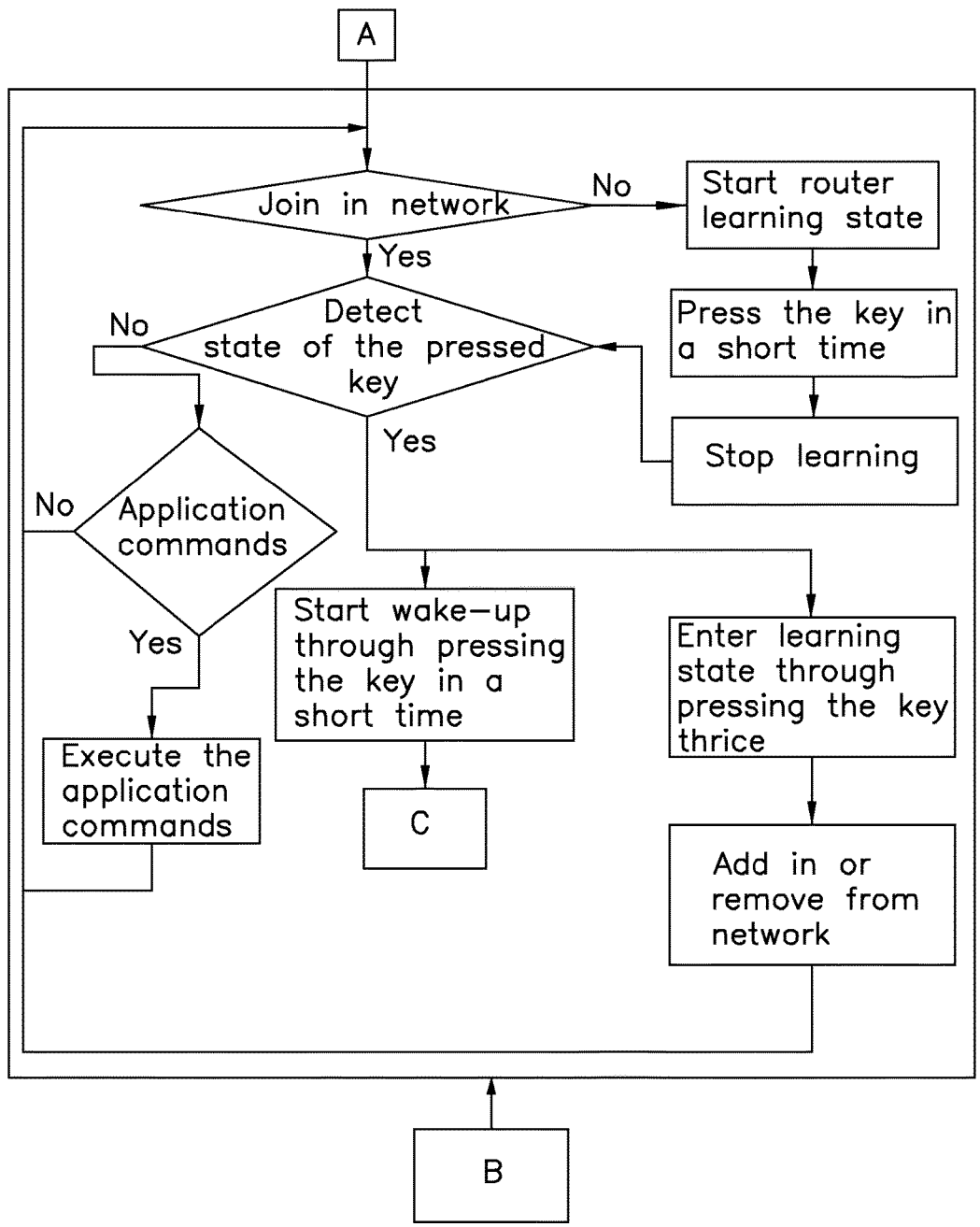

FIGS. 3A and 3B shows a flowchart showing operation processes of a software system of the disclosure. FIGS. 3A and 3B shows that steps of measuring carbon monoxide concentration include hardware initialization "ApplicationInitHW", software initialization "ApplicationInitSW", reading carbon monoxide data "Read", adding, and removing network, main circle "ApplicationPoll", and instruction data frame transmitting "ApplicationCommandHandler". The program configures serial port print information, to debug program conveniently. Carbon monoxide program can be accessed through timer interrupt, and the program can be operated in normal mode or low power-consumption mode.

The system starts the reset initialization and the initialization of the external input key of the hardware circuit, sets the SPI port circuit connected to the carbon monoxide module and the software initialization serial port baud rate, sets the system software parameters, boots the timer detection input key, and determines the power operation condition which is preset by procedure. In the state of battery operation, if the wake-up time for waking the timer has elapsed, the default sleep time is loaded. The power consumption of the sleep mode is the minimum. The network wake-up times are updated. If the pressing key is reset, the initialization sleep time is set, to awake the function of the timer. If the current state is not the start awake state, the system enters the idle state. If the external power supply is used, it will start the network for updating the timer every minute. The system enters the main loop.

If the device is not added in the network, the system enters the routing learning mode. If any key is pressed, the system stops learning and enters an idle state. If the device is added in the network, the system directly enters the idle state. If the next state of the system is busy, the system uses the current state, and the next state of the system is idle. If the current state and the next state of the system are idle, the system enters the key detection state. If any key is short pressed in a short time, the system enters the start awake state. When the system enters the key detection state, if any key is quickly pressed, the device can be added in or be removed from the network. The system can start the reset initialization when any key is pressed once. If no keys are pressed, the system determines whether there are application command request, if the wake-up time is reached, the system enters the reset initialization. Carbon monoxide module programs can be loaded through the timer, to store data in the read/write memory RAM.

A Second Embodiment

According to the second embodiment, a device for remotely sensing and monitoring temperature and humidity with a low power ad hoc network is provided. The device includes a physical quantity acquisition and processing unit 10, a Z-Wave core unit 20, an audible and visual alarm unit 30, a DC power supply 40, an E2PROM storage unit 50, a programmer port 60, and an RF antenna and matching circuit 70. In one embodiment, the physical quantity acquisition and processing unit 10 uses temperature and humidity intelligent modules, such as the HTG3833CH module of French HUMIREL company. The temperature and humidity module adopts a custom I2C port, and the other portions are same with the first embodiment of the present disclosure. The communication summary of the I2C port is described below:

a. using two-line serial communication including two lines of SCK and SDATA, and adopting custom I2C communication;

b. the register address: humidity data high address being 0x10, humidity data low address being 0x11, temperature data high address being 0x12, temperature data low address being 0x13, resolution address being 0x07, default address being 0x03, temperature data being 14 bits, and humidity data being 12 bits;

c. there are four command words: write command being 0x80, read command being 0x81, measure temperature being 0x82, and measure humidity being 0x83.

The device can remotely sense and monitor the above-mentioned carbon monoxide concentration, temperature, and humidity, and also can sense and monitor other physical quantities, such as voltage, current, power factor, power consumption, magnetic switches, three-axis angular velocity and gyros, flow, pressure, and weight through using the same method.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A method for remotely sensing and monitoring physical quantities with low power ad hoc network applicable to remotely monitor environment parameters and related physical quantities in a target locale, and convert the physical quantities sensed by various types of sensors set in the target locale to electrical signals and transmit the converted electrical signals to a remote controller through wireless network for processing and operation, the method comprising:

A. setting at least one intelligent sensor in the target locale, for collection of the physical quantities, data conversion and data correction, compensation, and data storage, and converting the physical quantities sensed by each sensor to quantized data in a fixed format;

B. adopting an embedded CPU of a Z-Wave module as a main microprocessor, ensuring read/write command address and timing of the intelligent sensors in software, and adopting general input output (I/O) of the Z-Wave module connected to special I/O ports of the intelligent sensors in hardware, to obtain two-way communication control function;

C. a Z-Wave network system forming a mesh network topology through a plurality of nodes added in the Z-Wave network, wherein the mesh network topology has self-organizing and self-healing flexible mechanisms, and addition or removal of each node is executed by the remote controller;

D. setting EEPROM or flash memory, to store configuration parameters, routing tables, network identification numbers HOME IDs, and portions of Z-Wave protocol data;

E. burning an initial file through a programmer port, wherein the Z-Wave module communicate with a main control circuit through a three-line serial peripheral interface (SPI) port, SPI bus master input/slave output (MISO), SPI bus master output/slave input (MOSI), serial clock (SCLK), and a select signal (EE_CS); and F. setting a maximum number of nodes as 232 in a network, setting an only unique and identical HOME ID, and setting different NOME IDs for different nodes.

2. The method of claim 1, wherein the network system in step C comprises less than 231 wireless device nodes, a controller, and/or a second portable controller, the network system achieves ad hoc network based on wireless nodes, and the network is a self-healing mesh network, each node functions as a relay router to transmit data.

3. The method of claim 1, wherein when a detected physical quantity received by the remote controller reaches a warning or an unreasonable value, the wireless nodes output an audible and visual alarm signal and upload data to the controller.

4. The method of claim 1, wherein the Z-Wave module applied in step B has a radio frequency front end which is a miniature planar antenna formed on a printed circuit board, and is an inductance capacitance (LC) matching network manufactured or soldered on the printed circuit board, a matching impedance is 50 ohms.

5. The method of claim 1, wherein the physical quantities to be monitored in step A comprises harmful gas concentration, temperature, and humidity all belonging to the environmental parameters, and pressure, flow, weight, switch quantities, voltage, current, power factor, and power consumption all belonging to other relevant physical quantities.

6. The method of claim 5, wherein the harmful gas concentrations belonging to the environmental parameters comprises concentrations of carbon monoxide, hydrogen sulfide, formaldehyde, and radioactive dusts in ambient air.

7. A device for remotely sensing and monitoring physical quantities with low power ad hoc network applicable to monitor and remotely transmit environment parameters of a locale where the device is located, the device comprising:

a physical quantity acquisition and processing unit, a Z-Wave core unit, an audible and visual alarm unit, a direct-current (DC) power supply, a memory unit, a programmer port, and a radio frequency (RF) antenna and matching circuit, wherein the Z-Wave core unit is bidirectionally connected to the processing unit, the RF antenna and matching circuit, the memory unit, and the programmer port through general input output (I/O) ports; the programmer port is bidirectionally connected to the memory unit through SPI ports; an output terminal of the Z-Wave core unit is connected to an input terminal of the audible and visual alarm unit; the DC power supply adopts two-way power supplies, one of which is provided by a 5.0V standard mini USB port, and the other of which is provided by a 4.5V which includes three dry batteries connected in series, and provides a 3.3V stable voltage with low noise low dropout linear regulator (LDO) ways to the Z-Wave core unit, namely, the 5.0V voltage is obtained from the standard mini USB port and is reduced to 4.5V through a high frequency filtering network, which is composed of a first high frequency inductor and first and second capacitors, and then through a second high frequency filtering choke, or the 4.5V is directly obtained from the dry batteries through a third high frequency choke and then through a stable voltage integrated circuit and first to third filtering capacitors of the output terminal of the stable voltage integrated circuit, to get the stable and pure 3.3V.

* * * * *